(12) United States Patent
Shkolnikov et al.

(10) Patent No.: US 7,781,944 B2
(45) Date of Patent: Aug. 24, 2010

(54) ELECTRICAL GENERATOR

(75) Inventors: Yury Shkolnikov, Glenview, IL (US); Leslie M. Watts, Tiger City, GA (US); Richard P. Bolger, Schaumburg, IL (US); Paul Micheli, Glen Ellyn, IL (US)

(73) Assignee: Illinois Tool Works Inc., Glenview, IL (US)

( * ) Notice: Subject to any disclaimer, the term of this patent is extended or adjusted under 35 U.S.C. 154(b) by 135 days.

(21) Appl. No.: 12/095,086

(22) PCT Filed: Nov. 27, 2006

(86) PCT No.: PCT/US2006/045442

§ 371 (c)(1), (2), (4) Date: Aug. 26, 2008

(87) PCT Pub. No.: WO2007/064602

PCT Pub. Date: Jun. 7, 2007

(65) Prior Publication Data

US 2008/0309196 A1 Dec. 18, 2008

Related U.S. Application Data

(60) Provisional application No. 60/741,115, filed on Dec. 1, 2005.

(51) Int. Cl.
*H01L 41/113* (2006.01)
(52) U.S. Cl. .................................................. 310/339
(58) Field of Classification Search ................. 310/339
See application file for complete search history.

(56) References Cited

U.S. PATENT DOCUMENTS

| | | |
|---|---|---|
| 3,608,823 A | 9/1971 | Buschor |
| 3,651,354 A | 3/1972 | Cowan |
| 3,666,976 A | 5/1972 | Gourlay et al. |
| 3,673,463 A | 6/1972 | Gourdine |
| 3,687,368 A | 8/1972 | Gerberth, Jr. |
| 3,731,145 A | 5/1973 | Senay |
| 3,791,579 A | 2/1974 | Cowan |
| 3,991,710 A | 11/1976 | Gourdine et al. |
| 4,020,393 A | 4/1977 | Porter |
| 4,165,022 A | 8/1979 | Bentley et al. |
| 4,219,865 A | 8/1980 | Malcolm |
| 4,248,386 A | 2/1981 | Morle |
| 4,290,091 A | 9/1981 | Malcolm |
| 4,331,298 A | 5/1982 | Bentley et al. |
| 4,433,003 A | 2/1984 | Gourdine |
| 4,467,236 A | 8/1984 | Kolm et al. |

(Continued)

OTHER PUBLICATIONS

International Search Report/Written Opinion based on PCT/US2006/045442 completed Jul. 31, 2007.

(Continued)

*Primary Examiner*—Thomas M Dougherty
(74) *Attorney, Agent, or Firm*—Barnes & Thornburg LLP

(57) ABSTRACT

An electrical generator includes a passageway having an input port and at least one output port and at least one resonator for converting acoustic vibrations established in the passageway into mechanical vibrations of the resonator. The resonator is oriented adjacent at least one output port. A mechanical-to-electrical transducer is coupled to the resonator for generating electricity in response to the mechanical vibrations.

25 Claims, 8 Drawing Sheets

U.S. PATENT DOCUMENTS

| | | |
|---|---|---|
| 4,498,631 A | 2/1985 | Gourdine |
| 4,574,092 A | 3/1986 | Gourdine |
| 5,039,901 A | 8/1991 | Newbould |
| 5,266,863 A | 11/1993 | Nonami et al. |
| 6,366,485 B1 | 4/2002 | Fujisawa |
| 6,995,496 B1 | 2/2006 | Hagood, IV et al. |
| 2004/0212280 A1 | 10/2004 | Radziemski et al. |
| 2008/0029624 A1 | 2/2008 | Shkolnikov et al. |

OTHER PUBLICATIONS

Goldman, Richard, "Ultrasonic Technology", 1962, *Reinhold Publishing Corporation*, pp. 94-102.

ELECTRICAL GENERATOR

CROSS-REFERENCE TO RELATED APPLICATIONS

This application is the U.S. national phase of PCT/US2006/045442 filed Nov. 27, 2006. PCT/US2006/045442 claims benefit under 35 U.S.C. §119(e) of the filing date of U.S. provisional patent application Ser. No. 60/741,115 filed Dec. 1, 2005. The disclosures of U.S. Ser. No. 60/741,115 and PCT/US2006/045442 are hereby incorporated herein by reference.

FIELD OF THE INVENTION

This invention relates to generators for generating electrical potentials.

BACKGROUND OF THE INVENTION

Various types of generators which employ piezoelectric transducers to generate electrical potentials are known. There are, for example, the devices illustrated and described in U.S. Pat. Nos. 4,248,386 and 3,666,976 and references cited in these. Various types of generators which employ fluid flow to generate electrical potentials are also known. There are, for example, the devices illustrated and described in U.S. Pat. Nos. 4,574,092, 4,498,631, 4,433,003, 4,020,393, 3,991,710, 3,791,579, 3,673,463, and 3,651,354 (generally electrogasdynamic potential supplies); and U.S. Pat. Nos. 4,290,091 and 4,219,865 (generally gas turbine driven generator/inverter/transformer/multiplier supplies and alternator/transformer/multiplier supplies), and U.S. Ser. No. 11/500,156, filed Aug. 7, 2006, titled Electric Power Generator, and assigned to the same Assignee as this application. There is also Richard G. Goldman, *Ultrasonic Technology*, Reinhold Publishing Corporation, New York, 1962, and particularly pages 94-102. The disclosures of these references are hereby incorporated herein by reference. This listing is not intended to be a representation that a complete search of all relevant art has been made, or that no more pertinent art than that listed exists, or that the listed art is material to patentability. Nor should any such representation be inferred.

DISCLOSURE OF THE INVENTION

According to an aspect of the invention, an electrical generator comprises a body providing a passageway having an input port and at least one output port, at least one resonator for converting acoustic vibrations established in the passageway into mechanical vibrations of the resonator, the at least one resonator oriented adjacent at least one output port, and a mechanical-to-electrical transducer coupled to the at least one resonator for generating electricity in response to the mechanical vibrations.

According to another aspect of the invention, an electrical generator comprises a body providing a passageway having an input port and at least one output port, at least one resonator for converting acoustic vibrations established in the passageway into mechanical vibrations of the resonator, the at least one resonator oriented outside at least one output port, and a mechanical-to-electrical transducer coupled to the at least one resonator for generating electricity in response to the mechanical vibrations.

According to another aspect of the invention, an electrical generator comprises a body providing a passageway having an input port and at least one output port, at least one resonator for converting acoustic vibrations established in the passageway into mechanical vibrations of the resonator, the at least one resonator oriented adjacent at least one output port and outside the passageway, and a mechanical-to-electrical transducer coupled to the at least one resonator for generating electricity in response to the mechanical vibrations.

Illustratively, the mechanical-to-electrical transducer does not lie along an axis of the passageway.

Illustratively, the passageway comprises a knife edge resonator

Alternatively illustratively, the passageway comprises a Hartmann generator.

Alternatively illustratively, the passageway comprises a Helmholtz resonator.

Alternatively illustratively, the passageway comprises a mechanical reed resonator.

Illustratively, the electrical generator includes multiple output ports and a resonator oriented adjacent each output port for converting acoustic vibrations established in the passageway into mechanical vibrations of the resonator.

Illustratively, there are multiple output ports oriented at different distances from the input port.

Illustratively, the mechanical-to-electrical transducers comprise piezoelectric transducers.

Illustratively, the resonators comprise somewhat dome-shaped resilient resonators.

Illustratively, the resonators comprise flexible metal resonators.

Illustratively, the passageway includes a closed end.

Illustratively, the closed end includes a diffuser.

Illustratively, the closed end is closed by an adjustable plug.

Illustratively, the adjustable plug includes a diffuser.

Further illustratively, the electrical generator includes a diffuser and a spring between the diffuser and the adjustable plug.

Illustratively, the spring is characterized by a non-linear spring constant.

Illustratively, the spring constant takes into account the approximate variation of the speed of sound with temperature.

Further illustratively, the electrical generator includes a power conditioning device.

Illustratively, the power conditioning device comprises an inverter.

Additionally or alternatively illustratively, the power conditioning device comprises a transformer.

Additionally or alternatively illustratively, the power conditioning device comprises a rectifier.

Additionally or alternatively illustratively, the power conditioning device comprises a multiplier.

Illustratively, a utilization device is combined with the electrical generator.

Illustratively, the utilization device comprises an electrostatically aided coating material atomizing and dispensing device.

Illustratively, the at least one output port comprises at least one tuned waveguide.

Illustratively, the resonator comprises a thicker cross section near a center of the resonator.

Illustratively, the thicker section is provided by one of gluing an additional member adjacent the center, welding an additional member adjacent the center, chemical additive machining, chemical subtractive machining, mechanical additive machining and mechanical subtractive machining.

Illustratively, the thicker section comprises one of a stepped central region and a central region of gradually increasing thickness.

BRIEF DESCRIPTION OF THE DRAWINGS

The invention may best be understood by referring to the following detailed description and accompanying drawings which illustrate the invention. In the drawings.

DETAILED DESCRIPTIONS OF ILLUSTRATIVE EMBODIMENTS

U.S. Pat. No. 3,666,976 describes a device that includes an air nozzle impinging on an annular knife edge/quarter wave resonant pipe. The pipe is terminated and closed opposite the nozzle end by a piezoelectric device that converts pressure fluctuations to electrical energy. Terminating a closed air column with a piezoelectric transducer in the manner described in U.S. Pat. No. 3,666,976 results in certain compromises in overall efficiency. A more effective closed resonator configuration results if the transducer/end presents a substantial acoustic impedance mismatch with the air in the column. Such a configuration provides the reflection needed for resonance. However, an impedance match is more desirable to efficiently convert pressure fluctuations to electrical energy. Thus efficient electrical power transfer must be compromised to maintain air column resonance.

Further, devices which produce resonating columns of air radiate a substantial amount of acoustic energy as acoustic waves. This energy is not used effectively in the prior art.

Figure 1:
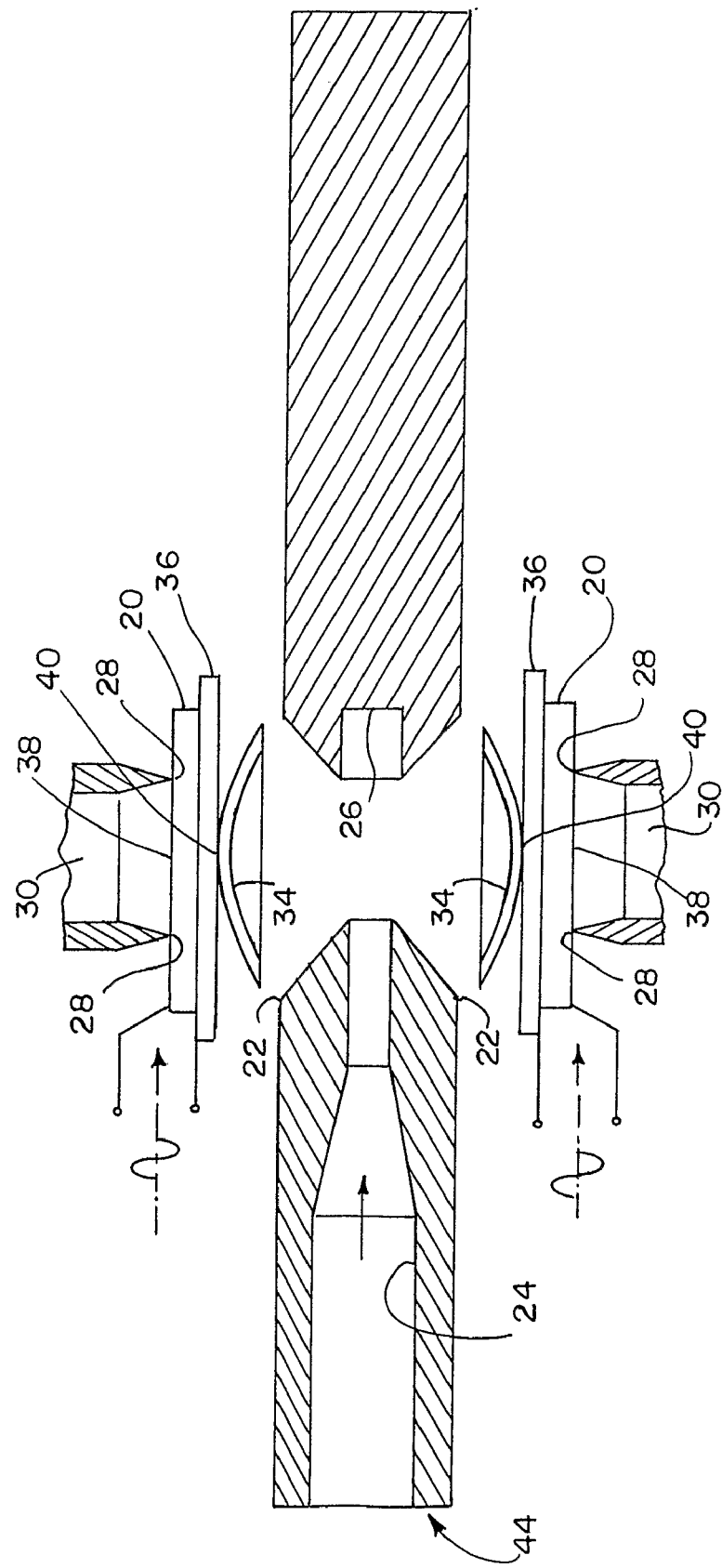
FIG. 1 illustrates a fragmentary cross sectional side elevational view of a device constructed according to the invention.

Referring to FIG. 1, according to an embodiment of the invention, arrays of one or more transducers 20, such as piezoelectric ceramic unimorph or bimorph transducers, are arranged adjacent openings 22 to atmosphere around a passageway 24, and not coaxially with the passageway 24. The passageway 24 has a closed end 26 not terminated in a transducer 20. With this configuration, the transducers 20 convert energy that is lost in prior art devices as acoustic radiation. The transducers 20 are attached, for example, by gluing with suitable adhesive(s), such as cyanoacrylate adhesive or the like, to knife edges 28 formed at the ends of respective tubes 30. The transducers 20 are joined to knife edges 28 at vibrational nodes of the transducers 20 so as not to unduly affect the vibrations of the transducers 20. Each transducer 20 is attached, for example, by gluing with suitable adhesive(s), such as cyanoacrylate adhesive or the like, to the adjacent flat face of a disk 36 of, for example, brass or other suitable material. The apex 40 of a somewhat dome-shaped flexible resonator 34 constructed from, for example, aluminum, is attached, for example, by gluing with suitable adhesive(s), such as cyanoacrylate adhesive or the like, to the opposite face of disk 36 opposite the center 38 of its respective transducer 20.

Figure 2:
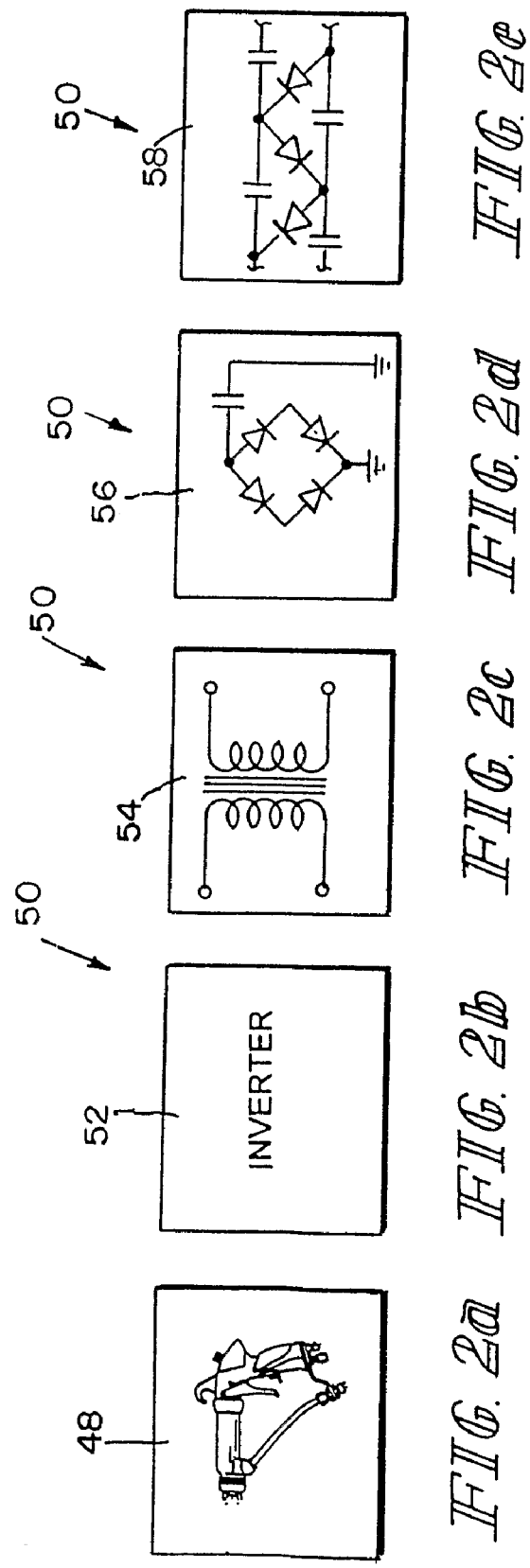
FIGS. 2a-e illustrate highly diagrammatically devices which are useful with the device illustrated in FIG. 1.

Driving fluid, for example, a subsonic, transonic or supersonic jet of air, is directed into the open end 44 of passageway 24, establishing the resonant column of air to drive the vibrations of transducers 20 which produce electrical current which is then supplied to a utilization device 48, FIG. 2a. The electrical current may be coupled to input terminals of suitable power conditioning equipment 50 such as, for example, (an) inverter(s) 52 (FIG. 2b) and/or transformer(s) 54 (FIG. 2c) and/or rectifier(s) 56 (FIG. 2d) and/or multiplier(s) 58 (FIG. 2e), and the like, which condition the output electrical signal from transducers 20 for use in utilization device 48, which may be, for example, an electrostatically aided coating material atomizer or the like. Such power conditioning equipment 50 may, for example, be equipment of the type illustrated and described in U.S. Pat. Nos. 4,331,298, 4,165,022, 3,731,145, 3,687,368, and/or 3,608,823.

Figure 3:
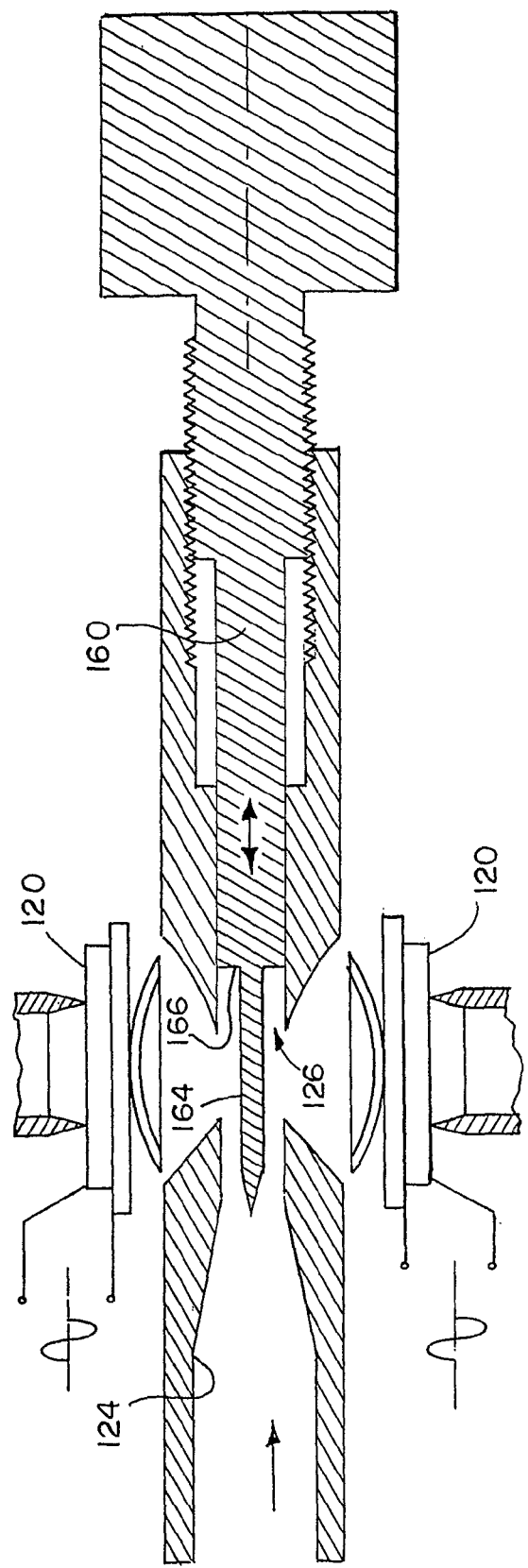
FIG. 3 illustrates a fragmentary cross sectional side elevational view of another device constructed according to the invention.

Referring now to FIG. 3, an embodiment is illustrated in which the passageway 124 has a length which is tunable by moving a tuning plug 160 in or out in the closed end 126 of the passageway 124. Illustratively, this is achieved by providing complementary threads on the outside of the tuning plug 160 and the inside of the passageway 124 adjacent its closed end 126. A somewhat needle-like or projectile-shaped diffuser 164 is provided on the end face 166 of the tuning plug 160 which assists in coupling the resonant vibrations from the passageway 124 to the transducers 120.

Figure 4:
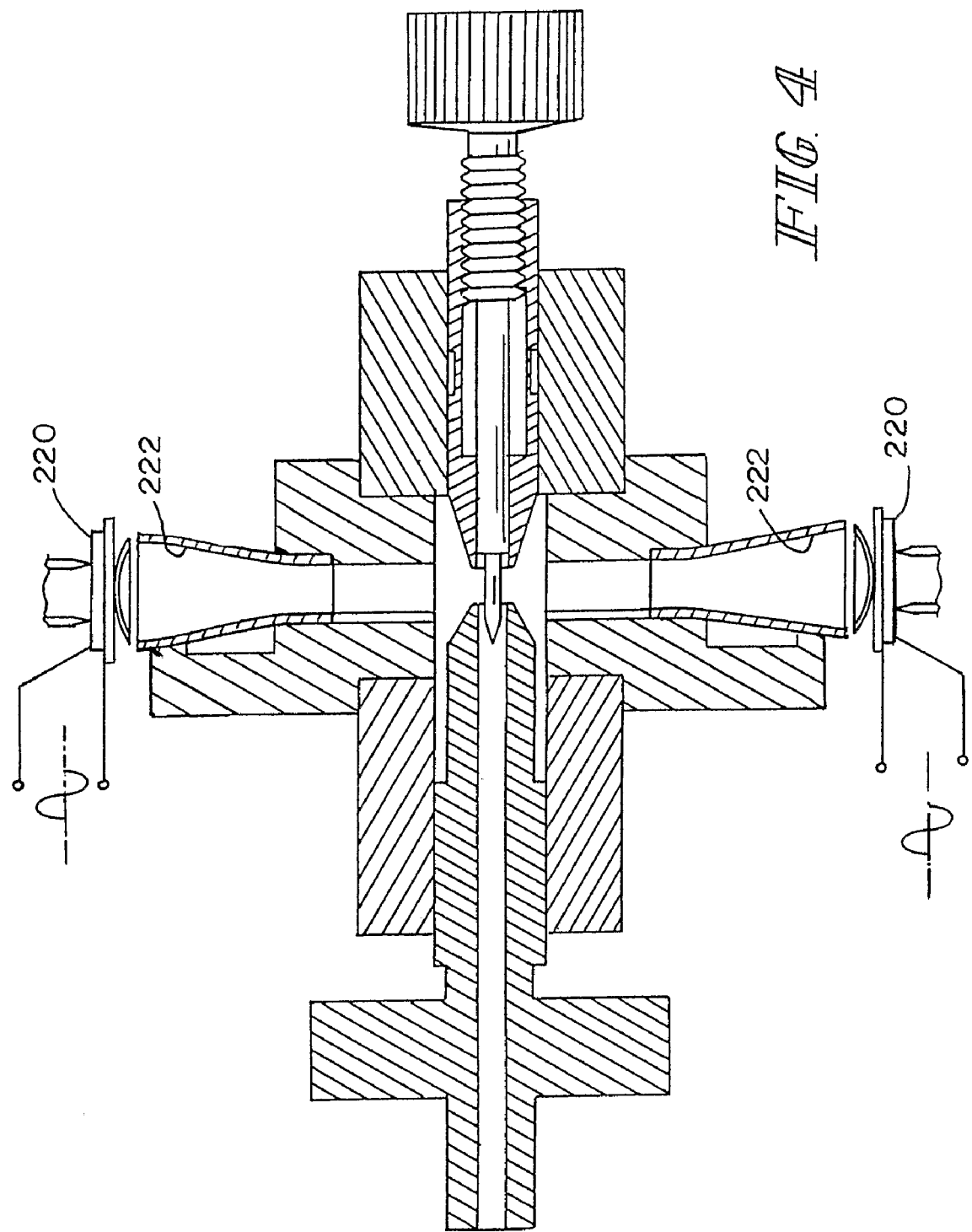
FIG. 4 illustrates a fragmentary cross sectional side elevational view of another device constructed according to the invention.

In yet another embodiment, illustrated in FIG. 4, the acoustic energy is channeled to the transducers 220 through tuned waveguides 222 of variable cross section. The variable cross sections of the waveguides 222 improve acoustic impedance matching.

Figure 5:
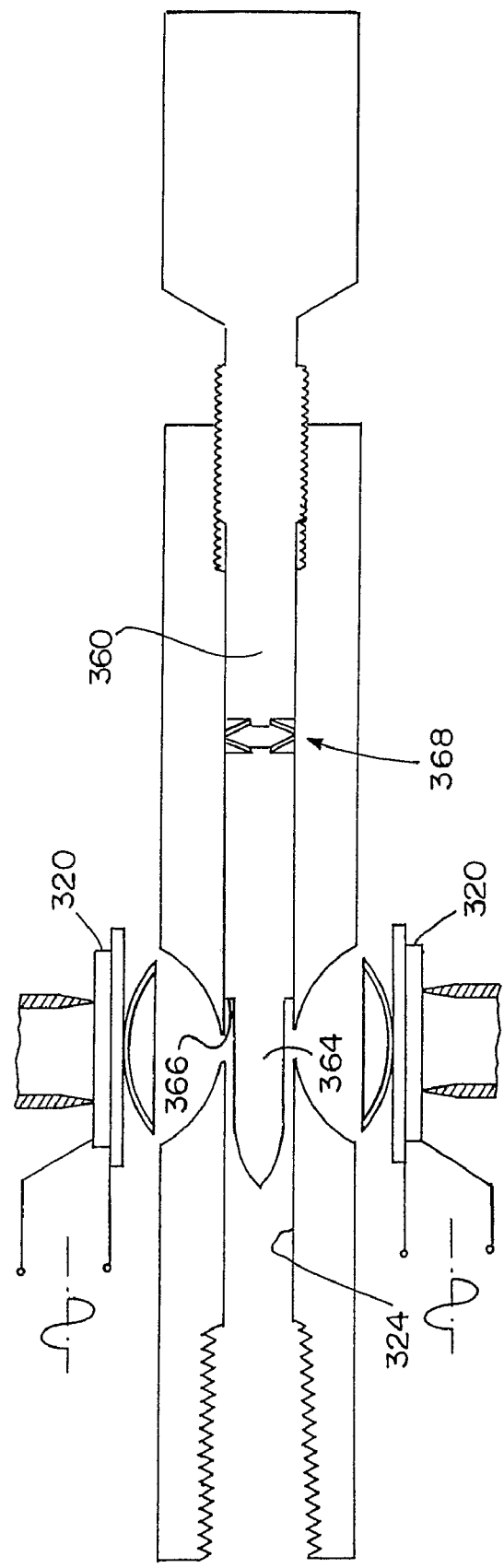
FIG. 5 illustrates a fragmentary cross sectional side elevational view of another device constructed according to the invention.

In yet another embodiment, illustrated in FIG. 5, the tuning plug 360 and diffuser 364 are separated by a spring 368 such as, for example, a non-linear compression spring. Creation and coupling of the vibrations in the passageway 324 to the transducers 320 is thought to be aided by permitting the diffuser 364 to move with respect to tuning plug 360. This embodiment may be useful, for example, in applications in which passageway 324 becomes a stagnation point. In such situations, the air temperature may tend to rise in passageway 324. Such temperature changes can result in changes in the speed of sound in passageway 324 and the resonant frequency of passageway 324. If the diffuser 364 containing the end wall 366 of passageway 324 is spring 368—mounted and permitted to move from stagnation pressure force, the system will tend to compensate for temperature changes and resonant frequency will tend to remain constant. A non-linear compression spring, the spring constant of which takes into account the approximate variation of the speed, c, of sound with temperature T ($c=\sqrt{\gamma RT}$), where T is the temperature in ° K, R is the universal gas constant and $\gamma$ is the ratio of the specific heats at constant pressure and constant volume, which for air is about 1.4) will tend to make the compensation more accurate.

Figure 6A:
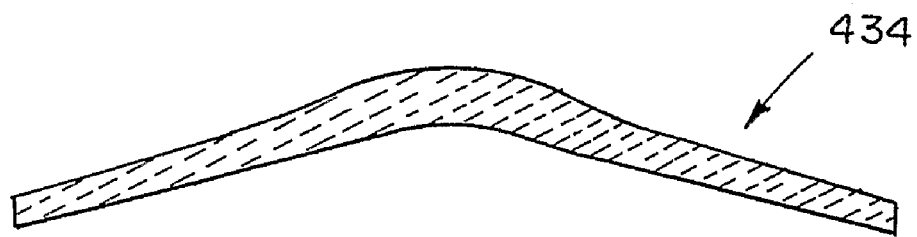
FIGS. 6a-b illustrate optional construction details of the devices illustrated in FIGS. 1 and 3-5.
Figure 6B:
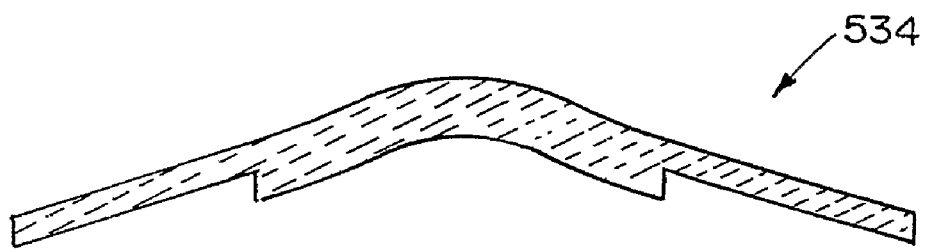

FIGS. 6a-b illustrate different cross sectional configurations for the dome-shaped flexible resonator 34. In FIG. 6a, a thicker cross section of a resonator 434 near the center provides additional mechanical strength in the high bending moment region. This thicker section is provided by a gradual taper. In the resonator 534 of FIG. 6b, this thicker section is a discrete step. These thicker cross sections near the centers of resonators 434, 534 may be achieved by gluing or welding (an) additional member(s) or by chemical or mechanical additive or subtractive machining (for example, deposition, etching, and so on).

Figure 7A:
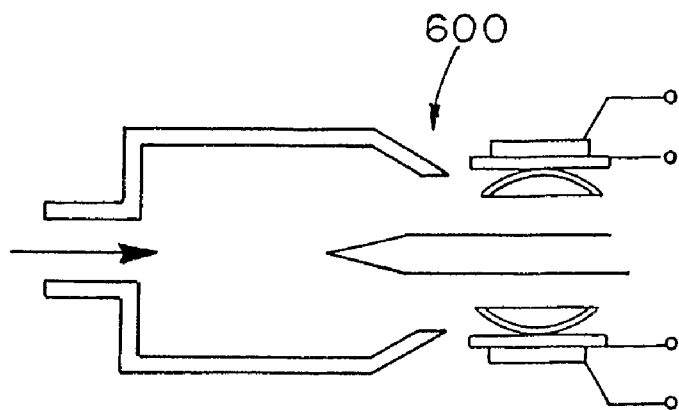
FIGS. 7a-c illustrate highly diagrammatically devices which are useful to practice the invention.
Figure 7B:
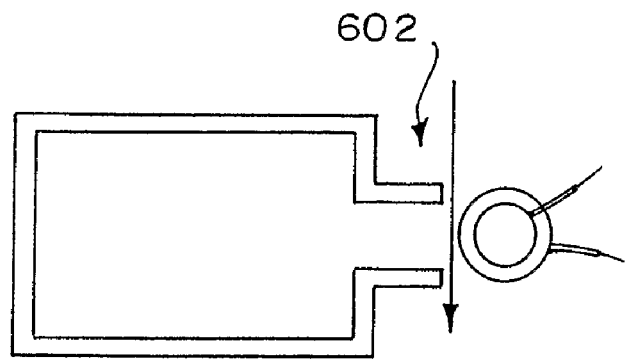
Figure 7C:
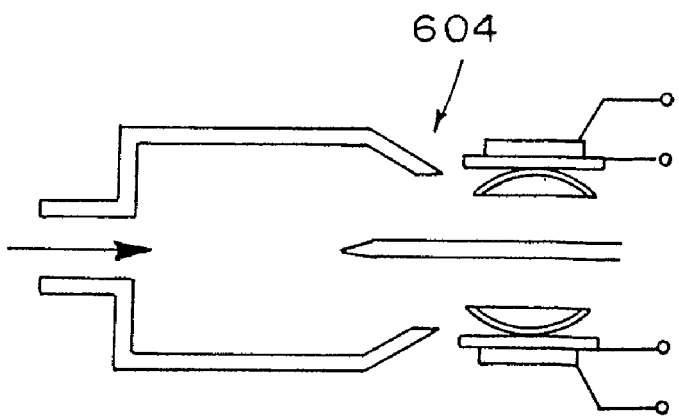

The first stage in the energy conversion of airflow is conversion of more well-behaved, for example, laminar or smooth, airflow into a resonating air column. Numerous mechanisms exist for doing this. One such mechanism is a knife edge resonator 600. See, for example, U.S. Pat. No. 3,666,976. Another, and the one which is used in the embodiments illustrated in FIGS. 1 and 3-5, is what is known as a Hartmann generator. See, for example, Goldman, *Ultrasonic Technology*, supra. Another is a Helmholtz resonator 602. Another is a mechanical reed resonator 604. Resonators 600, 602 and 604 are illustrated highly diagrammatically in FIGS. 7*a-c*, respectively.

Figure 8:
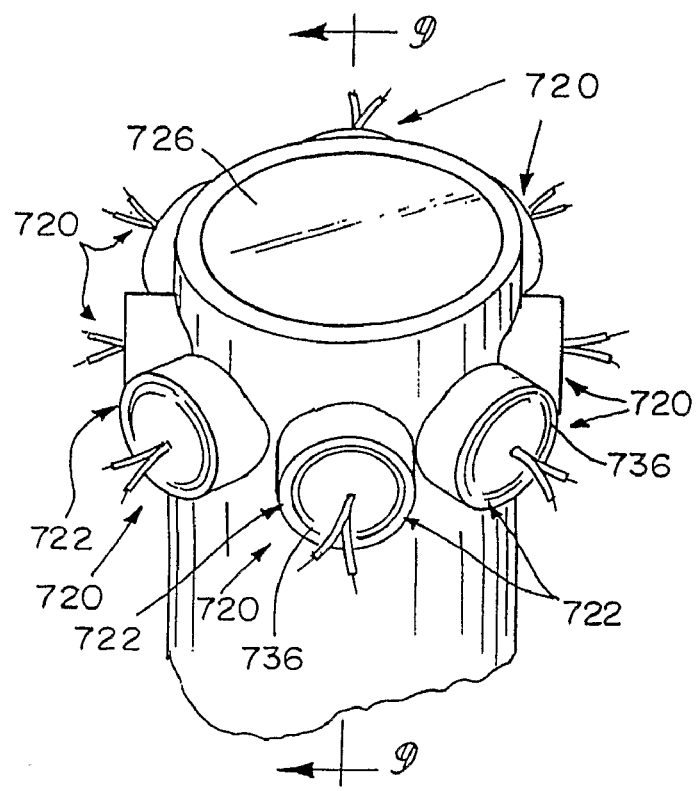
FIG. 8 illustrates a fragmentary perspective view of another device constructed according to the invention; and, FIG. 9 illustrates a sectional view of the device illustrated in FIG. 8 taken generally along section lines 9-9 of FIG. 8.
Figure 9:
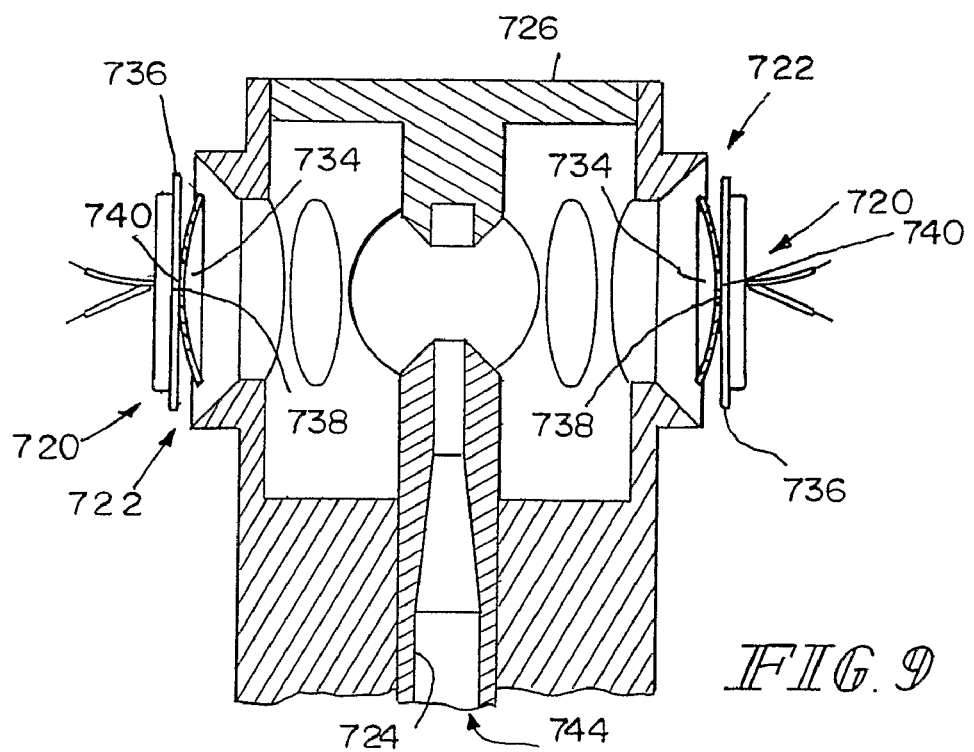

Referring to FIGS. 8-9, according to another embodiment, transducers 720 are arranged adjacent openings 722 to atmosphere around a passageway 724, and not coaxially with the passageway 724. The passageway 724 has a closed end 726 not terminated in a transducer 720. The transducers 720 are attached as described above to knife edges (which are not shown, for purposes of clarity) formed at the ends of respective tubes (also not shown for purposes of clarity). The transducers 720 are attached, for example, by gluing with suitable adhesive(s), such as cyanoacrylate adhesive or the like, to the adjacent flat faces of respective disks 736 of, for example, brass or other suitable material. The apexes 740 of respective somewhat dome-shaped flexible resonators 734 are attached, for example, by gluing with suitable adhesive(s), such as cyanoacrylate adhesive or the like, to the opposite faces of respective disks 736 opposite the centers 738 of their respective transducers 720.

Driving fluid, for example, a subsonic, transonic or supersonic jet of air, is directed into the open end 744 of passageway 724, establishing the resonant column of air to drive the vibrations of transducers 720 which produce electrical current which is then supplied to a utilization device such as atomizer 48 illustrated in FIG. 2*a*, typically through suitable power conditioning equipment 50 such as, for example, (an) inverter(s) 52 (FIG. 2*b*) and/or transformer(s) 54 (FIG. 2*c*) and/or rectifier(s) 56 (FIG. 2*d*) and/or multiplier(s) 58 (FIG. 2*e*), or the like.

While the illustrated embodiments have an open end 44, 744 and a closed end 26, 226, 726, it is believed that passageways like passageways 24, 124, 324, 724, but with two open ends, are useful as well.

What is claimed:

1. An electrical generator comprising a body providing a passageway including a closed end and having an input port and at least one output port, at least one resonator for converting acoustic vibrations established in the passageway into mechanical vibrations of the resonator, the at least one resonator oriented adjacent at least one output port, and a mechanical-to-electrical transducer coupled to the at least one resonator for generating electricity in response to the mechanical vibrations, the closed end closed by an adjustable plug.

2. The electrical generator according to claim 1 wherein the adjustable plug includes a diffuser.

3. The electrical generator according to claim 1 further including a diffuser, and a spring between the diffuser and the adjustable plug.

4. The electrical generator according to claim 3 wherein the spring is characterized by a non-linear spring constant.

5. The electrical generator according to claim 4 wherein the spring constant takes into account the approximate variation of the speed of sound with temperature.

6. The electrical generator according to claim 1 further including a power conditioning device.

7. An electrical generator comprising a body providing a passageway having an input port and at least one output port, at least one resonator for converting acoustic vibrations established in the passageway into mechanical vibrations of the resonator, the at least one resonator oriented adjacent at least one output port, and a mechanical-to-electrical transducer coupled to the at least one resonator for generating electricity in response to the mechanical vibrations, the at least one output port comprises comprising at least one tuned waveguide.

8. An electrical generator comprising a body providing a passageway having an input port and at least one output port, at least one resonator for converting acoustic vibrations established in the passageway into mechanical vibrations of the resonator, the at least one resonator oriented adjacent at least one output port, and a mechanical-to-electrical transducer coupled to the at least one resonator for generating electricity in response to the mechanical vibrations, the resonator comprising a thicker cross section near a center of the resonator.

9. The electrical generator according to claim 1 including multiple output ports and a resonator for converting acoustic vibrations established in the passageway into mechanical vibrations of the resonator oriented adjacent each output port.

10. The electrical generator according to claim 9 wherein there are multiple output ports oriented at different distances from the input port.

11. The electrical generator according to claim 1 wherein the mechanical-to-electrical transducers comprise piezoelectric transducers.

12. The electrical generator according to claim 1 wherein the resonators comprise somewhat dome-shaped resilient resonators.

13. The electrical generator according to claim 12 wherein the resonators comprise flexible metal resonators.

14. The electrical generator according to claim 7 including multiple output ports and a resonator for converting acoustic vibrations established in the passageway into mechanical vibrations of the resonator oriented adjacent each output port.

15. The electrical generator according to claim 14 wherein there are multiple output ports oriented at different distances from the input port.

16. The electrical generator according to claim 7 wherein the mechanical-to-electrical transducers comprise piezoelectric transducers.

17. The electrical generator according to claim 7 wherein the resonators comprise somewhat dome-shaped resilient resonators.

18. The electrical generator according to claim 17 wherein the resonators comprise flexible metal resonators.

19. The electrical generator according to claim 7 further including a power conditioning device.

20. The electrical generator according to claim 8 including multiple output ports and a resonator for converting acoustic vibrations established in the passageway into mechanical vibrations of the resonator oriented adjacent each output port.

21. The electrical generator according to claim 20 wherein there are multiple output ports oriented at different distances from the input port.

22. The electrical generator according to claim 8 wherein the mechanical-to-electrical transducers comprise piezoelectric transducers.

23. The electrical generator according to claim 8 wherein the resonators comprise somewhat dome-shaped resilient resonators.

24. The electrical generator according to claim 23 wherein the resonators comprise flexible metal resonators.

25. The electrical generator according to claim 8 further including a power conditioning device.

* * * * *